(12) United States Patent
Warren et al.

(10) Patent No.: US 6,818,110 B1
(45) Date of Patent: Nov. 16, 2004

(54) COMBINATORIAL ELECTROCHEMICAL DEPOSITION AND TESTING SYSTEM

(75) Inventors: Christopher J. Warren, Mountain View, CA (US); Robert C. Haushalter, Los Gatos, CA (US); Leonid Matsiev, Cupertino, CA (US); Martin Devenney, Mountain View, CA (US); Eric McFarland, Santa Barbara, CA (US); Earl Danielson, Palo Alto, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 418 days.

(21) Appl. No.: 09/694,176

(22) Filed: Oct. 23, 2000

Related U.S. Application Data

(60) Division of application No. 09/119,187, filed on Jul. 20, 1998, now Pat. No. 6,187,164, which is a continuation-in-part of application No. 08/941,170, filed on Sep. 30, 1997, now Pat. No. 6,468,806.

(51) Int. Cl.[7] ............................................. G01N 27/26
(52) U.S. Cl. .................... 204/406; 204/230.1; 204/267; 204/280; 204/412; 204/434; 422/82.01
(58) Field of Search .......................... 204/228.9, 229.9, 204/230.1, 267, 280, 400, 406, 412, 434, 208, 100, 228.7; 422/82.01

(56) References Cited

U.S. PATENT DOCUMENTS

| | | |
|---|---|---|
| 4,082,619 A | 4/1978 | Dehnert |
| 4,155,815 A | 5/1979 | Francis et al. |
| 4,539,932 A | 9/1985 | Vecellio |
| 4,689,246 A | 8/1987 | Barrett |
| 4,871,435 A | 10/1989 | Denofrio |
| 5,093,874 A | 3/1992 | Hawkins et al. ............... 385/8 |
| 5,100,524 A | 3/1992 | Lester |
| 5,345,213 A | 9/1994 | Semancik et al. |
| 5,356,756 A | 10/1994 | Cavicchi et al. |
| 5,421,987 A | 6/1995 | Tzanavaras et al. |
| 5,427,674 A | 6/1995 | Langenskiold et al. |
| 5,441,619 A | 8/1995 | Kawachi et al. |
| 5,487,824 A | 1/1996 | Griego |
| 5,496,463 A | 3/1996 | Mori et al. |
| 5,556,530 A | 9/1996 | Finkelstein et al. |
| 5,640,047 A | 6/1997 | Nakashima .................. 257/738 |
| 5,641,391 A | 6/1997 | Hunter et al. |
| 5,656,139 A | 8/1997 | Carey et al. |
| 5,660,699 A | 8/1997 | Saito et al. |
| 5,667,667 A | 9/1997 | Southern |
| 5,672,256 A * | 9/1997 | Yee ............................ 204/403 |

(List continued on next page.)

FOREIGN PATENT DOCUMENTS

WO    WO 96/11878    4/1996

OTHER PUBLICATIONS

Chu, Deryn, et al. J. Electrochem. Soc., vol. 143, No. 5, pp. 1685–1690, (1996).

Richarz, Frank, et al. "Surface and electrochemical characterization of electrodeposited PtRu alloys," Surface Science, vol. 335, pp. 361–371, (1995).

Commonly Owned Co–pending Ser. No. 08/941,170.

Reddington, Erik; Sapienza, Anthony; Gurau, Bogdan; Viswanathan, Rameshkrishnan; Sarangapani, S.; Smotkin, Eugene S.; Mallouk, Thomas E., Combinatorial Electrochemistry: A Highly Parallel, Optical Screening Method for Discovery of Better Electrocatalysts, SCIENCE, vol. 280, pp. 1935–1937 (Jun. 12, 1998).

*Primary Examiner*—Roy King
*Assistant Examiner*—William T. Leader

(57) ABSTRACT

An electrochemical deposition and testing system consisting of individually addressable electrode arrays, a fully automated deposition head, and a parallel screening apparatus is described. The system is capable of synthesizing and screening millions of new compositions at an unprecedented rate.

9 Claims, 6 Drawing Sheets

U.S. PATENT DOCUMENTS

| | | | |
|---|---|---|---|
| 5,695,833 A | 12/1997 | Bok et al. | |
| 5,755,948 A | 5/1998 | Lazaro et al. | |
| 5,786,239 A | 7/1998 | Ohsawa et al. | 438/123 |
| 5,955,028 A * | 9/1999 | Chow | 422/63 |
| 6,132,683 A | 10/2000 | Sugihara et al. | 422/82.01 |
| 6,187,164 B1 | 2/2001 | Warren et al. | |
| 6,211,576 B1 | 4/2001 | Shimizu et al. | 257/786 |
| 6,306,348 B1 | 10/2001 | Havens et al. | 422/68.1 |
| 6,468,806 B1 | 10/2002 | McFarland et al. | |
| 6,656,826 B2 | 12/2003 | Ishimaru | 438/612 |
| 6,664,138 B2 | 12/2003 | Igarashi et al. | 438/126 |

* cited by examiner

COMBINATORIAL ELECTROCHEMICAL DEPOSITION AND TESTING SYSTEM

This application is a divisional of U.S. application Ser. No. 09/119,187 filed on Jul. 20, 1998, now U.S. Pat. No. 6,187,164, which itself is a continuation-in-part of U.S. application Ser. No. 08/941,170 filed Sep. 30, 1997, now U.S. Pat. No. 6,468,806, the techniques of each of which are incorporated herein by reference for all purposes.

FIELD OF THE INVENTION

The present invention relates to methods and apparatus for the electrodeposition of diverse materials. More specifically, the invention comprises a fully automated electrochemical deposition and testing system for the synthesis and parallel screening of distinct materials on arrays of individually addressable electrodes.

BACKGROUND OF THE INVENTION

Among the different techniques for the preparation of metal deposits, electrodeposition (also known as electroplating) is particularly attractive because of its relatively inexpensive instrumentation, low temperature operation, and simplicity. A further advantage of the technique is the relatively straightforward control of the thickness and composition of the depositing layers through electrical quantities such as current passed and potential applied.

Electroplating has been employed in small scale as well as industrial processes. For example, electroplating of precious metals to improve the appearance of an article or to create special effects is well known. Electroplating is also employed to improve the corrosion resistance of corrosive substances by depositing thin surface films of corrosion resistant metals such as zinc, tin, chromium, nickel and others. Wear resistant and friction modifying coatings of nickel, chromium, titanium and other metals and their alloys are used to improve the wear resistance of bearing surfaces. Electroplating is also employed in the electronics industry to improve or modify the electrical properties of substrates such as contacts, printed circuits, electrical conductors, and other electrical items in which specific surface or surface-to-substrate conductive properties are desired. Distinct metals are often electroplated onto metal surfaces to improve soldering characteristics or to facilitate subsequent coating by painting or application of other adhering films such as plastics, adhesives, rubber, or other materials.

Although the electrodeposition of a single material has been extensively studied, the deposition of two or more metals by electrochemical methods is difficult because the conditions favorable for the deposition of one metal may differ substantially with those necessary for the deposition of the other. Factors including widely differing reduction potentials, internal redox reactions that can alter the oxidation states of the materials in solution, and species that are or become insoluble during the deposition can disrupt the process. Moreover, the nature of the electrodeposit itself is determined by many factors including the electrolyte composition, pH, temperature and agitation, the potential applied between the electrodes, and the current density. These issues are more prevalent as the complexity of the electrodeposit (and hence the number of species in solution) increases.

Complex electodeposited materials are desired in areas such as catalysis where the composition of the electrodeposit is critical to its catalytic activity. The discovery of new catalytic materials depends largely on the ability to synthesize and analyze new compounds. Given approximately 100 elements in the periodic table that can be used to make such catalysts, and the fact that ternary, quaternary and greater compositions are desired, an incredibly large number of possible compositions is generated. Taking each of the previously noted electrochemical issues into account for every possible electrodeposit and designing a synthetic strategy that can effectively cover phase space using traditional synthetic methodologies is a time consuming and laborious practice. As such, there exists a need in the art for a more efficient, economical, and systematic approach for the synthesis of novel materials and for the screening of such materials for useful properties. See, for example, copending U.S. patent application Ser. No. 08/327,513 entitled "The Combinatorial Synthesis of Novel Materials" (published as WO 96/11878).

As an example of the utility of exploring phase space for more effective catalysts, one can consider the effect of changing the composition of the anode in a direct methanol fuel cell. A tremendous amount of research in this area has concentrated on exploring the activity of surface modified binary, and to a much lesser extent ternary, alloys of platinum in an attempt to both increase the efficiency of and reduce the amount of precious metals in the anode part of the fuel cell. Although electrodeposition was explored as a route to the synthesis of anode materials (e.g., F. Richarz et al. *Surface Science*, 1995, 335, 361), only a few compositions were actually prepared, and these compositions were made using traditional single point electrodeposition techniques. Such an approach becomes very inefficient when exploring and optimizing new multi-component systems. Recently, Mallouk, et al. reported work on combinatorial electrochemistry as a route to fuel cell anode materials (*Science*, 1998, 280, 1735), but this technique did not employ electrodeposition techniques.

The present invention provides a method to use electrodeposition to synthesize and evaluate large numbers of distinct materials in relatively short periods of time, significantly reducing the time consuming and laborious processes normally associated with a novel materials discovery program.

SUMMARY OF THE INVENTION

This invention provides methods and apparatus for electrochemically depositing distinct materials on arrays of individually addressable electrodes. The invention also provides a means of testing the as deposited materials for specific properties of interest.

One embodiment of the invention includes the individually addressable electrode arrays and their associated fabrication and processing steps.

Another embodiment of the invention includes an automated deposition system comprising a solution delivery head and its associated electronics and robotics. The delivery head is capable of automatically dispensing precise mixtures of plating solutions to predefined locations above the working electrodes on the individually addressable electrode arrays. The head contains a reference and counter electrode, and while delivering the plating solutions completes a circuit with a given working electrode on the array. Adjusting the potential applied to the working electrode on the array results in the deposition of materials from the delivered plating solutions.

Another embodiment of the invention includes an electrochemical testing system comprising an electrochemical cell, a multi-channel potentiostat, and an electronic interface designed to couple the addressable array to the potentiostat such that individual electrodes on the array may be addressed, either serially or in parallel, for the measurement of a specific material property under investigation.

BRIEF DESCRIPTION OF THE DRAWINGS

In order to better understand the present invention, reference should be made to the following detailed description taken in conjunction with the accompanying drawings wherein:

FIGS. 2A and 2B are examples of masks for array fabrication;

DETAILED DESCRIPTION OF THE INVENTION

The present invention comprises an electrochemical synthesis and testing system consisting of a number of separate parts including individually addressable electrode arrays, a fully automated deposition head, an electrochemical cell and its associated electronics, and a multi-channel potentiostat. These components provide a means for investigating complex multi-component systems, by giving a user the ability to rapidly synthesize and evaluate large numbers of diverse materials in short periods of time.

Figure 1A:
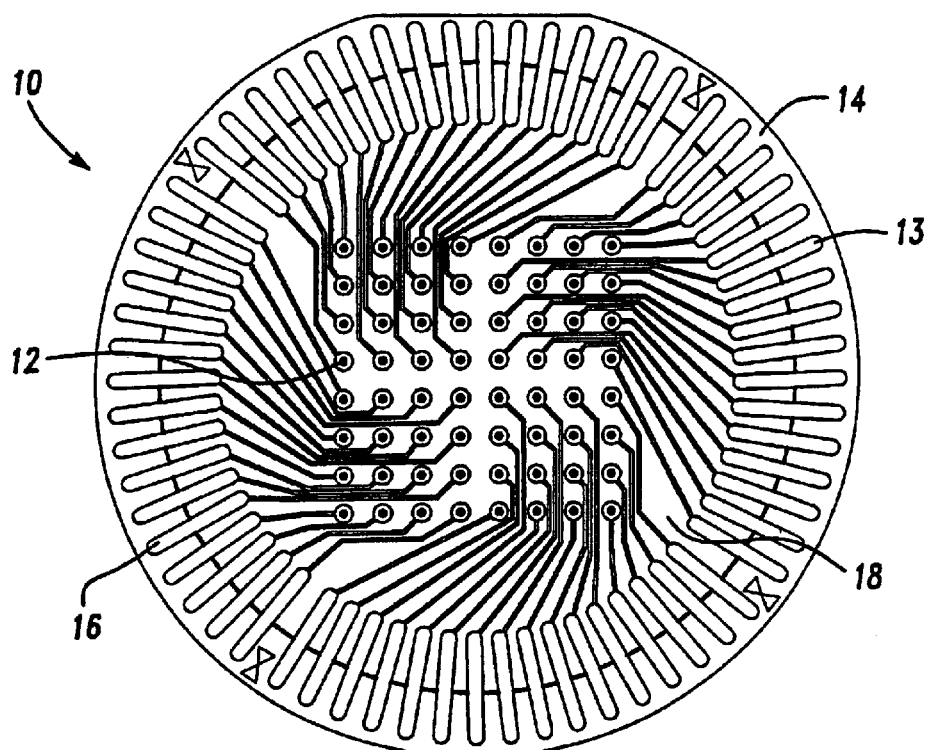
FIG. 1A illustrates an array of 64 individually addressable electrodes made in accordance with the present invention.
Figure 1B:
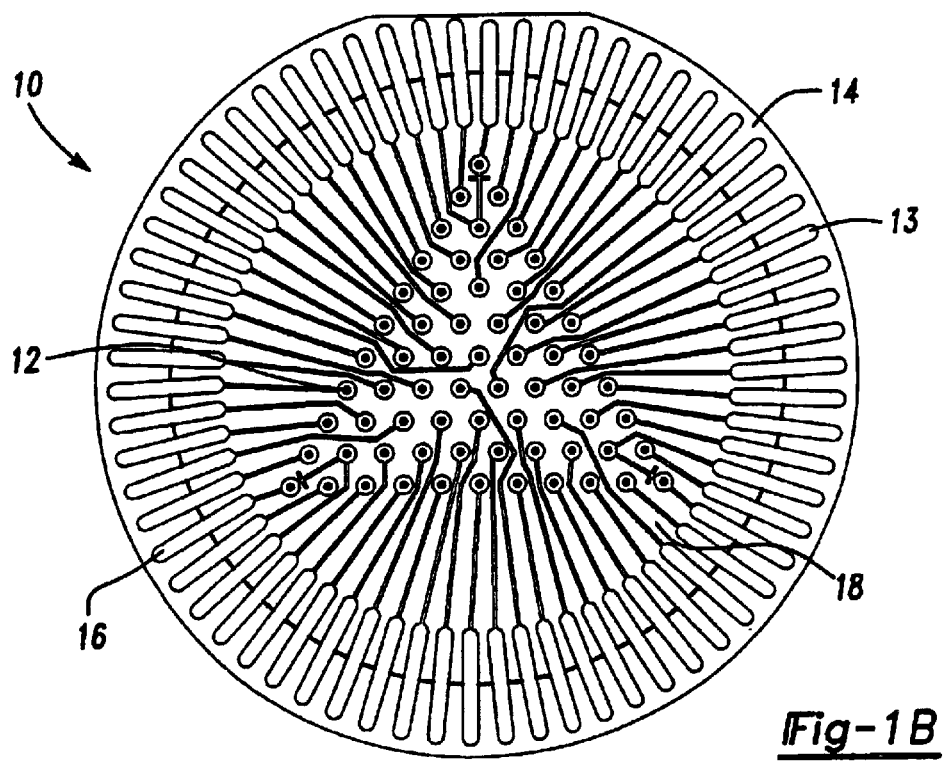
FIG. 1B illustrates an array of 66 individually addressable electrodes made in accordance with the present invention.

The individually addressable electrode arrays 10 of the present invention are illustrated in FIGS. 1A and 1B. The arrays 10 consist of either sixty-four or sixty-six independent electrodes 12 (with areas of between 1 and 2 $mm^2$) that are fabricated on inert substrates 14. Arrays with as little as 10 or as many as 100 electrodes may be made in accordance with the methods provided in the present invention. Example substrates include, but are not limited to, glass, quartz, sapphire, alumina, plastics, or thermally treated silicon. Other suitable substrate materials will be readily apparent to those of skill in the art. The individual electrodes 12 are located substantially in the center of the substrate 14, and are connected to contact pads 13 around the periphery of the substrate with wires 16. The electrodes 12, associated wires 16, and contact pads 13 are fabricated from conducting materials (such as gold, silver, platinum, copper, or other commonly used electrode materials). In a preferred embodiment of the present invention, the arrays are fabricated on standard 3" thermally oxidized single crystal silicon wafers, and the electrodes are gold with surface areas of about 1.26 $mm^2$.

Still referring to FIGS. 1A and 1B, a patterned insulating layer 18 covers the wires 16 and an inner portion of the peripheral contact pads 13, but leaves the electrodes 12 and the outer portion of the peripheral contact pads 13 exposed (preferably approximately half of the contact pad 13 is covered with this insulating layer). Because of the insulating layer 18, it is possible to connect a lead (e.g., an alligator clip) to the outer portion of a given contact pad 13 and address its associated electrode 12 while the array 10 is immersed in solution, without having to worry about reactions that can occur on the wires 16 or peripheral contact pads. The insulting layer 18 may be, for example, glass, cilica ($SiO_2$), alumina ($Al_2O_3$), magnesium oxide (MgO), silicon nitride ($Si_3N_4$), boon nitride (BN), yttrium oxide ($Y_2O_3$), titanium dioxide ($TiO_2$), hardened photoresist, or other suitable material known to be insulating in nature.

Once a suitable inert substrate is provided, photolithographic techniques can be applied to design and fabricate electrode array patterns on it. By applying a predetermined amount of photoresist to the substrate, photolyzing preselected regions of the photoresist, removing those regions that have been photolyzed (e.g., by using an appropriate developer), depositing one or more metals over the entire surface and removing predetermined regions of these metals (e.g., by dissolving the underlying photoresist), one can fabricate intricate patterns of individually addressable electrodes on the substrate.

Figure 2A:
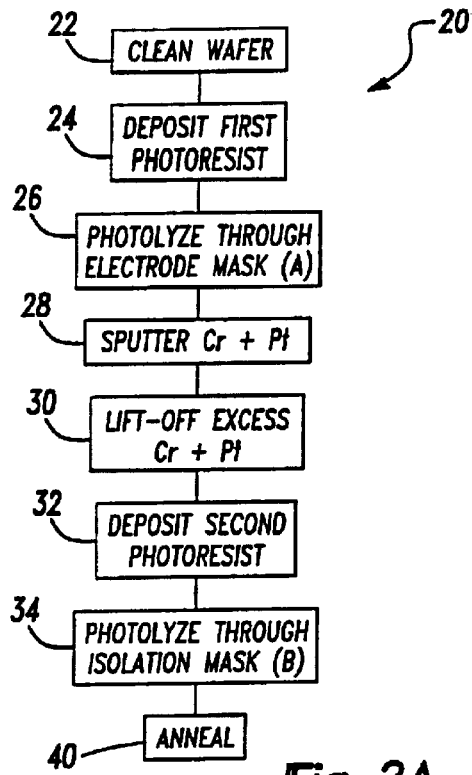
FIG. 2A is a flow chart diagram describing the processes involved in fabricating individually addressable electrode arrays.

The process by which the individually addressable electrode arrays of the present invention are fabricated is described with reference to the flow chart illustrated in FIG. 2A. Starting with a cleaning step 22 that comprises washing the wafer in a suitable solvent (such as methanol or isopropanol) followed by baking in a plasma cleaning oven, a photoresist deposition step 24 in which a first layer of photoresist is applied to the wafer is then done. Although many different types of photoresist can be used for the same effect, the preferred type in the present invention is Shipley Microposit S-1813 (or equivalent). The photoresist is applied to the wafer using a standard spin coating system (commonly used and familiar to those skilled in the art) which is set to leave a final thickness of between 1 and 2 $\mu m$ on the wafer. The photoresist is then cured at a predetermined temperature for a predetermined time to condition the photoresist. In a preferred embodiment of the present invention, the curing temperature is between 90° C. and 130° C. and the curing time is between 30 sec and 2 minutes.

Figure 2B:
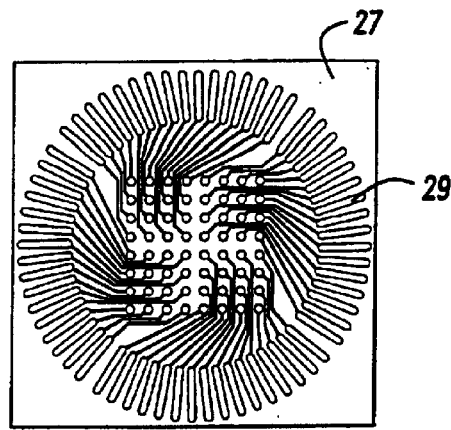
Figure 2C:
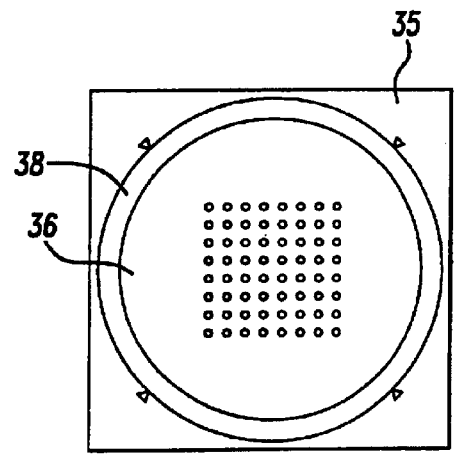

A primary electrode mask 27, an example of which is shown in FIG. 2B, (which is the negative of the electrode array pattern desired) is then placed over the wafer that is then photolyzed on a mask aligner system (commonly used and familiar to those skilled in the art). After exposure to ultraviolet (UV) light during the photolysis step 26, regions 29 on the wafer are then dissolved away using an appropriate developing solution (e.g., Shipley Microposit MF-319 or equivalent). The wafer is then placed in a physical vapor deposition (PVD) system where a metals are deposited during a metal deposition step 28. Example PVD systems include: sputtering, electron beam evaporation and pulsed laser deposition. The metals deposited by the appropriate PVD system consist of an adhesion layer (such as Cr, Ta, or W) followed by the desired electrode material (such as Au, Ag Cu or Pt). The thicknesses of these layers may vary substantially, but are typically 100–500 Å for the adhesion layer and 1000–5000 Å for the electrode layer. Following a lift-off step 30 to remove the excess metals, a second layer of photoresist is then deposited on the wafer during a second photoresist deposition step 32, cured as described above, and photolyzed through an isolation mask 35 during a second photolysis step 34. The aim of this second photolysis step is to expose only the regions of the electrode pads 36 and an outer contact ring 38, the exposed photoresist on which is dissolved away after the photolysis step. A final annealing step 40 at between 90° C. and 130° C. for between 1 minute and 10 (or more) minutes hardens the remaining photoresist into an effective insulating layer. Alternately, an insulating layer (such as glass, silica, alumina, magnesium oxide, silicon nitride, boron nitride, yttrium oxide or titanium dioxide) may be deposited in place of the hardened photoresist by a suitable PVD technique after photolysis of the second photoresist layer through an inverse isolation mask (the negative of the isolation mask 35 in FIG. 2C).

The arrays of the present invention consist of a plurality of individually addressable electrodes that are insulated from each other (by adequate spacing) and from the substrate (since they are fabricated on an insulating substrate), and whose interconnects are insulated from the electrochemical testing solution (by the hardened photoresist or other suitable insulating material). The number of electrodes can vary according to a desired number, but typically the arrays consist of 10 or more electrodes, 30 or more electrodes, and preferably more than 50 electrodes. In the embodiments shown in FIG. 1A and FIG. 1B, more than 60 electrodes are in a single array. Materials are deposited on each of the individually addressable electrodes. Thus, an array of individually addressable materials is also a part of this invention, with the number of materials equaling the number of addressable electrodes. The materials in the array may be the same or different, as described below.

The deposition of materials on the above described electrode arrays to make a library of an equal number of compositions is accomplished by the electrodeposition of species from solution using standard electrochemical methods. The compositions may all be the same, or may be different from each other. In one embodiment of the present invention, the depositions are carried out by immersing the electrode array in a standard electrochemical deposition chamber containing the array, a platinum mesh counter electrode, and a reference electrode (e.g., Ag/AgCl). The chamber is filled with a plating solution containing known amounts of source materials to be deposited. By selecting a given electrode and applying a predetermined potential for a predetermined amount of time, a particular composition of materials (which may or may not correspond to the exact composition of the plating solution) is deposited on the electrode surface. Variations in the compositions deposited may be obtained either by directly changing the solution composition for each deposition or by using different electrochemical deposition techniques, or both. Examples of how one may change the electrode composition by changing the deposition technique can include: changing the deposition potential, changing the length of the deposition time, varying the counter anions, using different concentrations of each species, and even using different electrochemical deposition programs (e.g., potentiostatic oxidation/reduction, galvanostatic oxidation/reduction, potential square-wave voltammetry, potential stair-step voltammetry, etc.). Through repeated deposition steps, a variety of materials may be serially deposited on the array for the aforementioned library.

Figure 3:
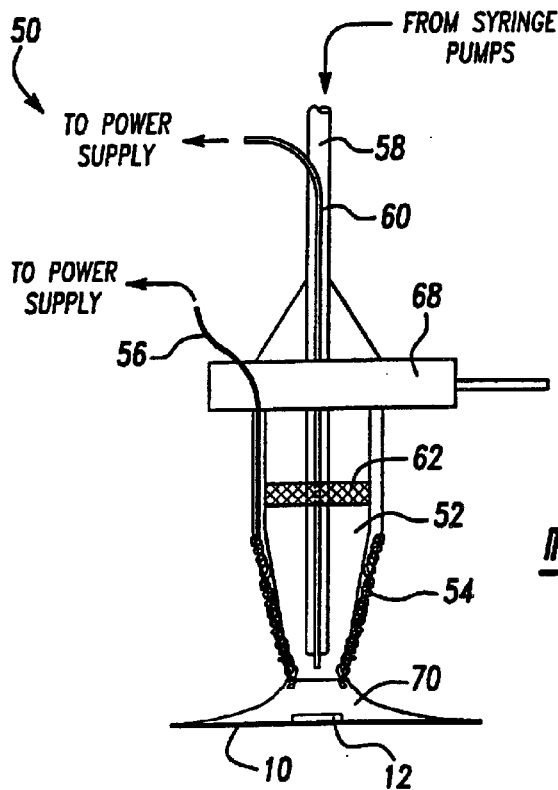
FIG. 3 is a sectional view of the electrochemical deposition head.

In an alternate embodiment of the present invention, the deposition of materials on the electrode array is carried out using a partially or fully automated solution delivery/electroplating system consisting of a deposition head and its associated syringe pumps, robotics and electronics. As illustrated in FIG. 3, the deposition head 50 consists of a rod 52 that is tapered at the tip. The tapered end of the deposition head is wrapped with a mesh counter electrode 54 (e.g., Pt) that is connected to an external power supply (not shown) via a wire 56 that is embedded in the wall of the head. In a preferred embodiment of the present invention, the deposition head has a 1–3 mm ID which is tapered to ca. 1 mm ID at the tip. A solution delivery tube 58 containing an inter-annular reference electrode 60 is located into the center of the rod 52. The reference electrode 60 may be a standard reference electrode (such as Ag/AgCl, SHE, SCE or Hg/HgSO$_4$) or a quasi-reference electrode (such as a piece of Pt wire). The reference electrode 60 is split off from the solution delivery tube 58 and connected to an external power supply or potentiostat (not shown). The flow of liquids through the solution delivery tube 58 is controlled by commercially available syringe pumps (not shown) that can precisely deliver volumes of liquids with accurate displacements in the $\mu$L/hour regime. Although any number of syringe pumps can be used, at least one is desirable and the exact number of pumps will ultimately depend on the complexity of the desired depositions (i.e., binary=two pumps, ternary=three pumps, quaternary=four pumps, etc.). The liquids that are dispensed from the aforementioned pumps are either mixed prior to entering the solution delivery tube (via an external mixer) or via a frit 62 embedded in the deposition head. During the deposition process, the deposition head 50 is held over a given electrode pad 12 on an electrode array 10 by a clamp 68 that is connected to robotics (not shown) that can control its precise position. In a preferred embodiment of the present invention, the ideal position, as illustrated in FIG. 3, is ca. 1–2 mm above the electrode pad 12.

Still referring to FIG. 3, the operation of the automated deposition system is described as follows. After positioning the deposition head above a given electrode (sometimes referred to as the 'working' electrode), the syringe pumps are activated causing a predetermined mixture of liquids containing predetermined amounts of source materials to flow through the tube 58 at an exactly specified flow rate and collect in a region 70 surrounding a given electrode 12. When the liquid contacts all three electrodes, a complete electric circuit is formed in this region. Coincident with the formation of this circuit, a predetermined potential is applied to the working electrode (via an external power supply or potentiostat) causing species present in the liquid above it to deposit on the electrode surface. After a predetermined deposition time, the head is rinsed and moved to the next electrode where the next specified mixture is delivered and plated out. In a preferred embodiment of the present invention, a deposition time of between 1 and 2 minutes is used. The entire procedure can take less than 3 minutes per deposition or about three hours per library of sixty-four to sixty-six elements.

Figure 4A:
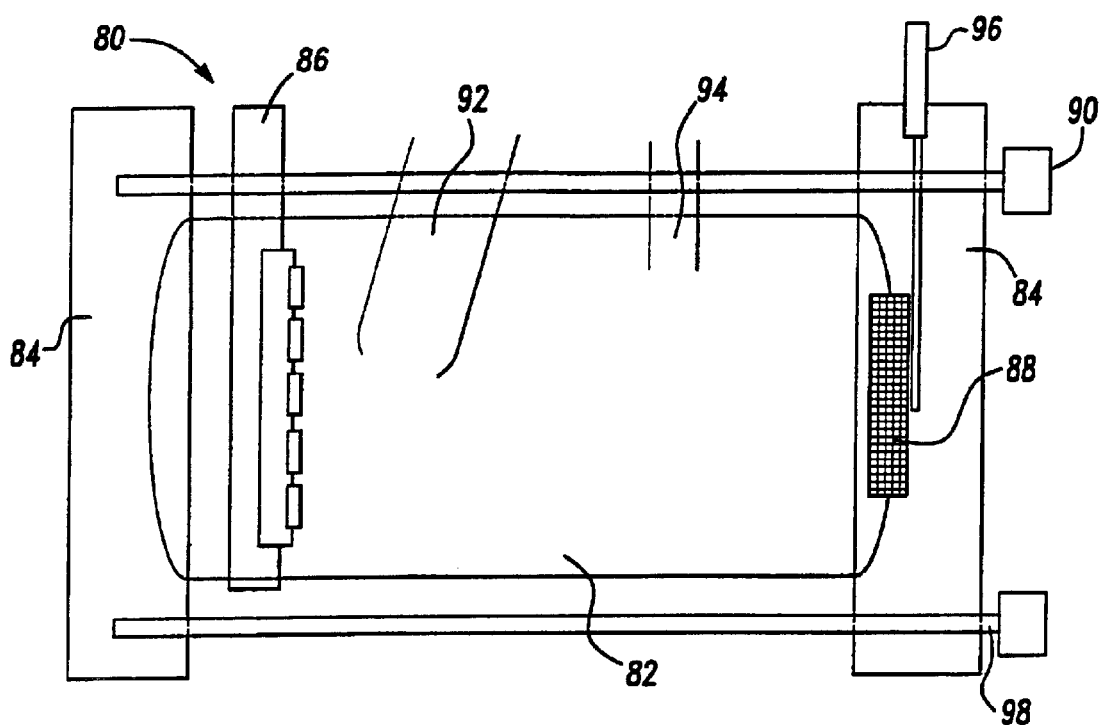
FIG. 4A is a sectional view of the electrochemical cell.
Figure 4B:
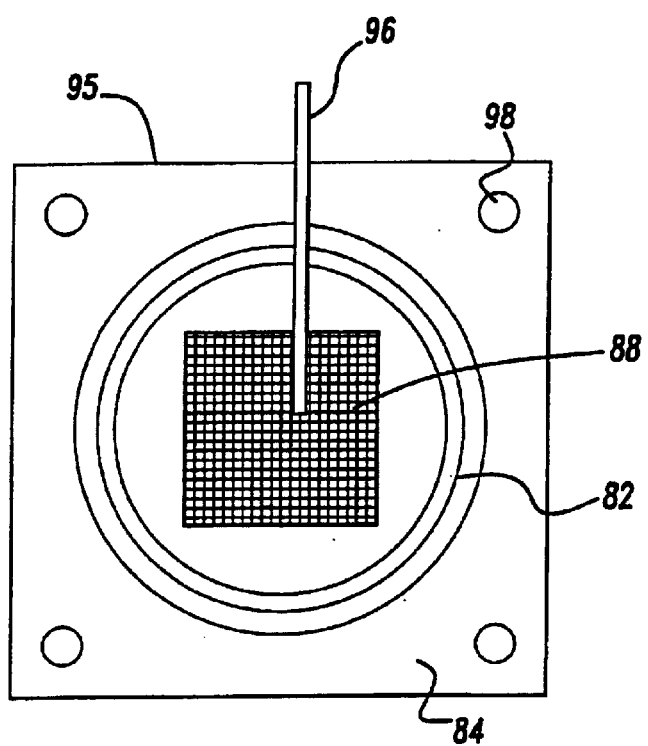
FIG. 4B is a sectional view of the cathode assembly associated with the electrochemical cell of FIG. 4A.

The electrochemical cell used to measure properties of the materials deposited on the above described electrode arrays is illustrated in FIGS. 4A–4E. Referring to FIGS. 4A–4B, the cell 80 comprises a cylindrical glass housing 82 (of approximate diameter equal to that of the wafers) that is sandwiched between two plastic end members 84. The anode array assembly 86, which holds the individually addressable electrode arrays 10, is fit into one side of the cell, and the cathode assembly 95, which holds a counter electrode 88 and its associated external wire coupling 96, is fit into the other side. The cell is held together by four screw fasteners 90 which fit through holes 98 located on the corners of the end members 84. A reference electrode compartment 92 is bored into the glass housing to allow the insertion of a reference electrode (not shown). A liquid filling hole 94 allows for the filling and drainage of testing solutions from the electrochemical cell.

Figure 4C:
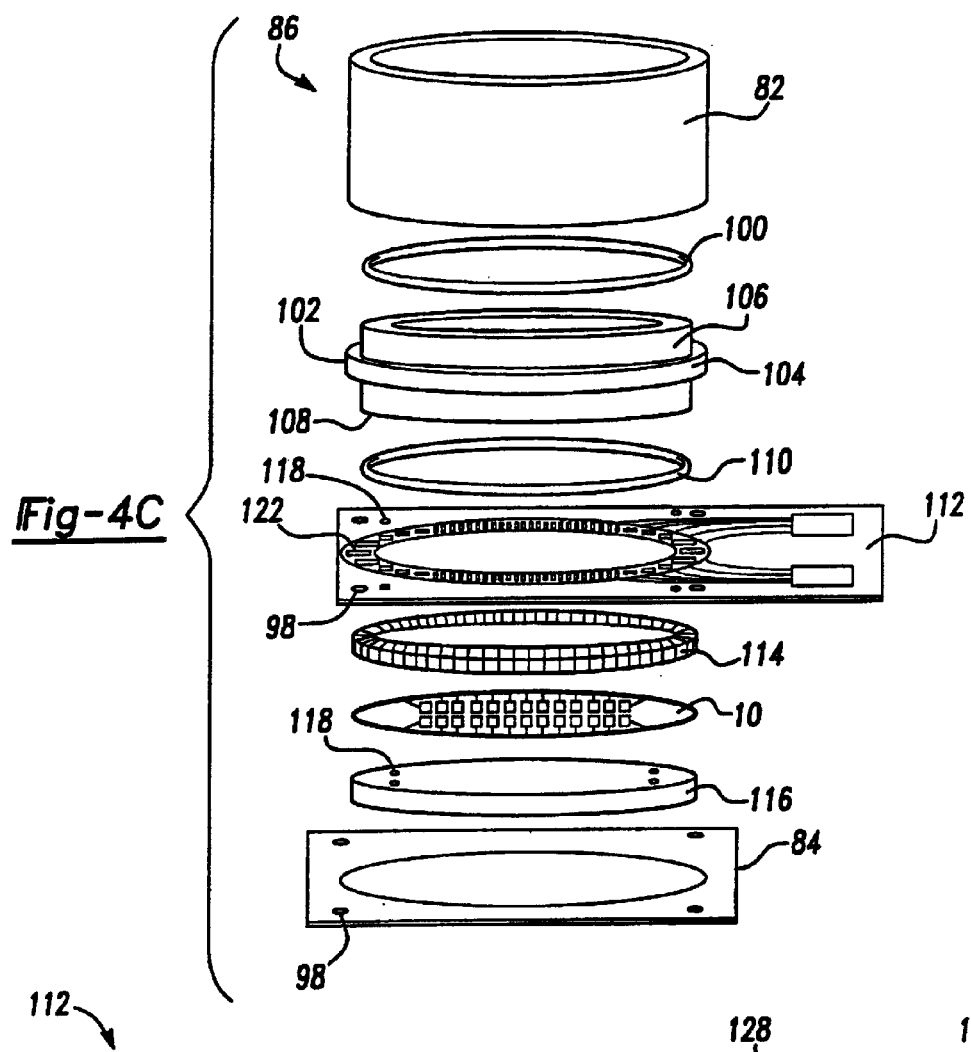
FIG. 4C is an exploded view of the anode assembly associated with the electrochemical cell of FIG. 4A.

Referring to FIG. 4C, an exploded view of the components of the anode assembly is shown. The glass housing 82 of the cell is fit over the inner flange 106 of a molded adapter 102 and is held in place against the adapter with an o-ring 100. This o-ring provides a water-tight seal for this part of the assembly. The diameter of the outer flange 104 of the adapter 102 is the same as that of the glass housing, while that of the inner flange 106 is slightly smaller allowing one half of it to fit into the glass housing and the other half of it to fit into the remaining pieces of the anode assembly. A groove 108 is cut into the lower lip of the adapter 102. This groove holds an o-ring 110 which makes a water-tight seal with the anode array 10 when the adapter is pressed against it. Electrical contact to the anode array 10 is made using a ring of elastomeric contacts 114 which are pressed between the peripheral pads of the array (see FIGS. 1A–1B) and contact pads 122 on a printed circuit board (PCB) assembly 112. These elastomeric contacts contain miniature wires encased in a flexible rubber sheath. They are commercially available and known to those skilled in the art. The anode array 10 is affixed to a backing plate 116 and attached to the PCB 112 with screws (not shown) through holes 118. This backing plate holds the electrode array and ensures contact between the peripheral pads on the wafer and the contacts on the PCB. This completes the anode assembly which is fitted together with screw fasteners 90 through holes 98 in end member 84 as shown in FIG. 4A.

Figure 4D:
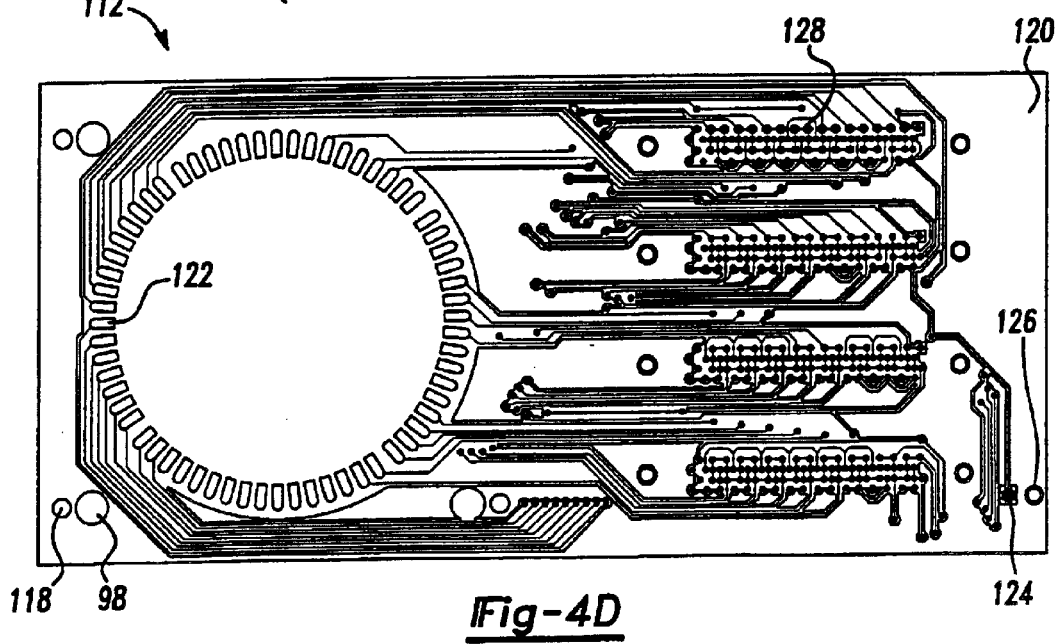
FIG. 4D is a sectional view of the PCB interface associated with the anode assembly of FIG. 4C.
Figure 4E:
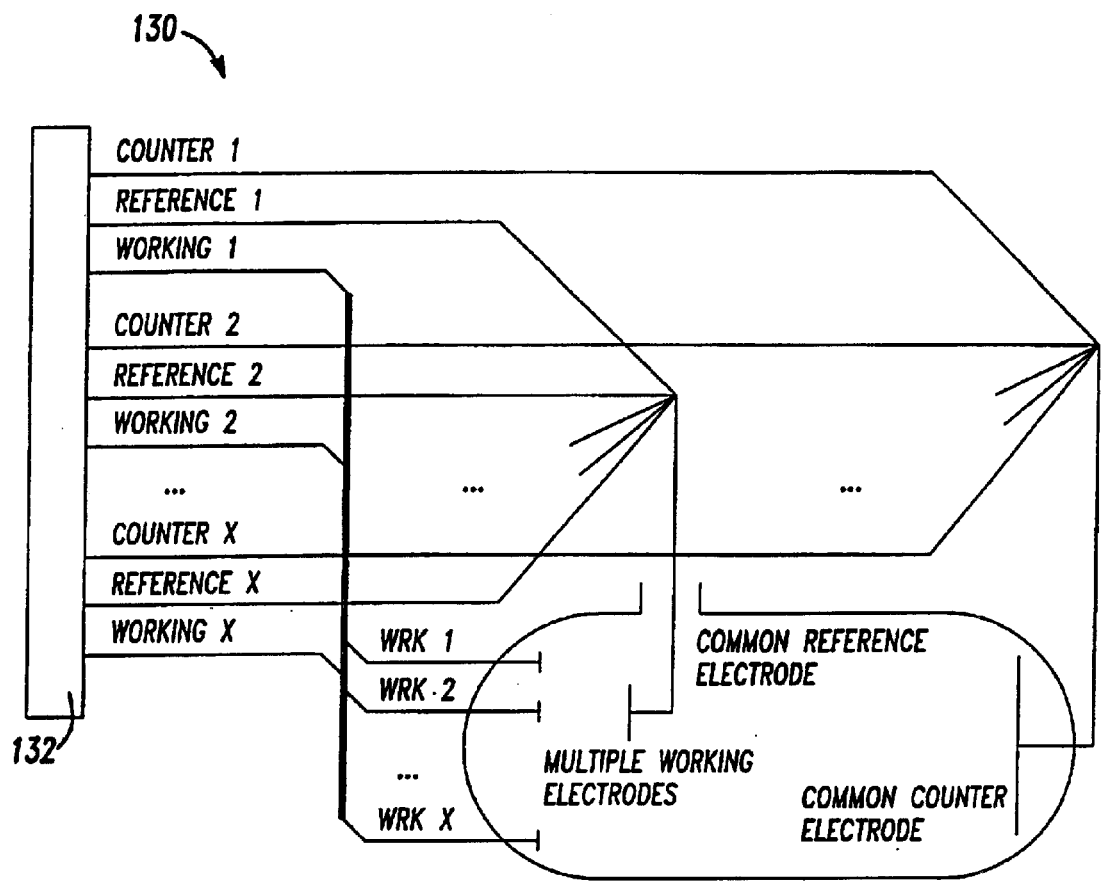
FIG. 4E is a circuit diagram showing the electrical connections in the PCB interface of FIG. 4D.

Referring now to FIGS. 4D–4E, the PCB 112 and its associated circuit diagram 130 are described as follows. The PCB 112 consists of a rectangular plate 120 on which is deposited an intricate pattern of wires and connectors. The contact pads 122, which provide electrical connection to peripheral pads on the anode array (FIGS. 1A–1B), are routed to four high-density pin connectors 128 that provide a cable connection to an external power supply (not shown) or multi-channel potentiostat 132. The multi-channel potentiostat 132 is essentially a collection of individual potentiostats bundled together in a single unit. These individual potentiostats can precisely control the current or potential applied to each electrode in the system. A common reference electrode contact 124 and a common counter electrode contact 126 are also wired to the high density pin connectors so that individual electrode pads on a given electrode array may be connected to the same reference and counter electrode during test measurements in the electrochemical cell.

Using the PCB 112 in conjunction with the deposition head 50 (FIG. 3) and the multi-channel potentiostat, each individual electrode on a given anode array can be individually addressed (e.g., during a electrodeposition procedure). Alternatively, using the PCB in connection with the electrochemical cell whip 80 (FIG. 4A) and multi-channel potentiostat, all of the electrodes on the array may be simultaneously addressed (e.g., during a catalytic activity measurement). Such catalytic measurements can be made in a time fame of between 1 and 2 minutes for each array of materials.

In the PCB illustrated in FIG. 4D, a sixty-four contact pad configuration is shown. It should be understood that a sixty-six contact pad configuration would be needed for experiments using a sixty-six member electrode array (FIG. 1B), and that PCB's having greater or less contact pads and associated connections are straightforward extensions of the concept and intended to be included within the scope of the present invention.

EXAMPLE

The following example illustrates the electrochemical deposition and screening measurements for a very specific system using selected embodiments of the present invention. It is only one of the many possible uses of the present invention. The example illustrates how a library of sixty-four different Pt—Ru compositions may be prepared and tested for methanol oxidation activity. It should be understood that the solution and electrode compositions, types of reference and counter electrodes, applied and measured potentials, screening test conditions, and associated results are merely illustrative and that a person skilled in the art may make reasonable substitutions or modifications to these components without deviating from the spirit and scope of the invention.

A binary Pt—Ru library containing sixty-four different Pt—Ru compositions was synthesized on a sixty-four element individually addressable electrode array (gold electrodes) using the electrochemical reduction of acidic solutions containing mixtures of platinum chloride ($H_2PtCl_6$) and ruthenium chloride ($RuCl_3$). Starting with a stock solution of 150 ml of 0.01M $RuCl_3$ (in 0.5M $H_2SO_4$) that was placed in a standard electrochemical deposition chamber along with the electrode array, a Pt mesh counter electrode, and a silver/silver chloride (Ag/AgCl) reference electrode, the first working electrode on the array was held at a constant potential of –0.25V (vs Ag/AgCl) for two minutes under constant stirring. The electrode array was then rotated in the deposition chamber and the solution composition adjusted (by the removal of a 5 ml aliquot of the $RuCl_3$ solution and its replacement with a 5 ml aliquot of a 0.01M $H_2PtCl_6$ solution), where the next electrode was deposited at the same potential and for the same amount of time. This procedure was continued until all sixty-four electrodes were deposited with Pt—Ru compositions, whose thickness averaged between 1000–2000. Analysis (via X-ray fluorescence measurements) of the sixty-four electrodes showed a continuously varying gradient of Ru and Pt compositions among the sixty-four electrodes on the array.

This Pt—Ru library was then screened for methanol oxidation activity by placing it into the electrochemical cell (described earlier) which was filled with a solution of 1.0M methanol in 0.5M $H_2SO_4$ (a standard testing solution composition for studying the electrooxidation of methanol in fuel cells). The cell also contained a $Hg/HgSO_4$ reference electrode and a Pt mesh counter electrode. Chronoamperometry measurements (i.e., holding a given electrode at a given potential and measuring the current that passes as a function of time) were then performed on all of the electrodes in the library by pulsing each individual electrode to a potential of –0.125V (vs $Hg/HgSO_4$) and holding it there for 1 minute while monitoring and recording the current that passed. The results of this experiment are depicted in FIG. 5.

Figure 5:
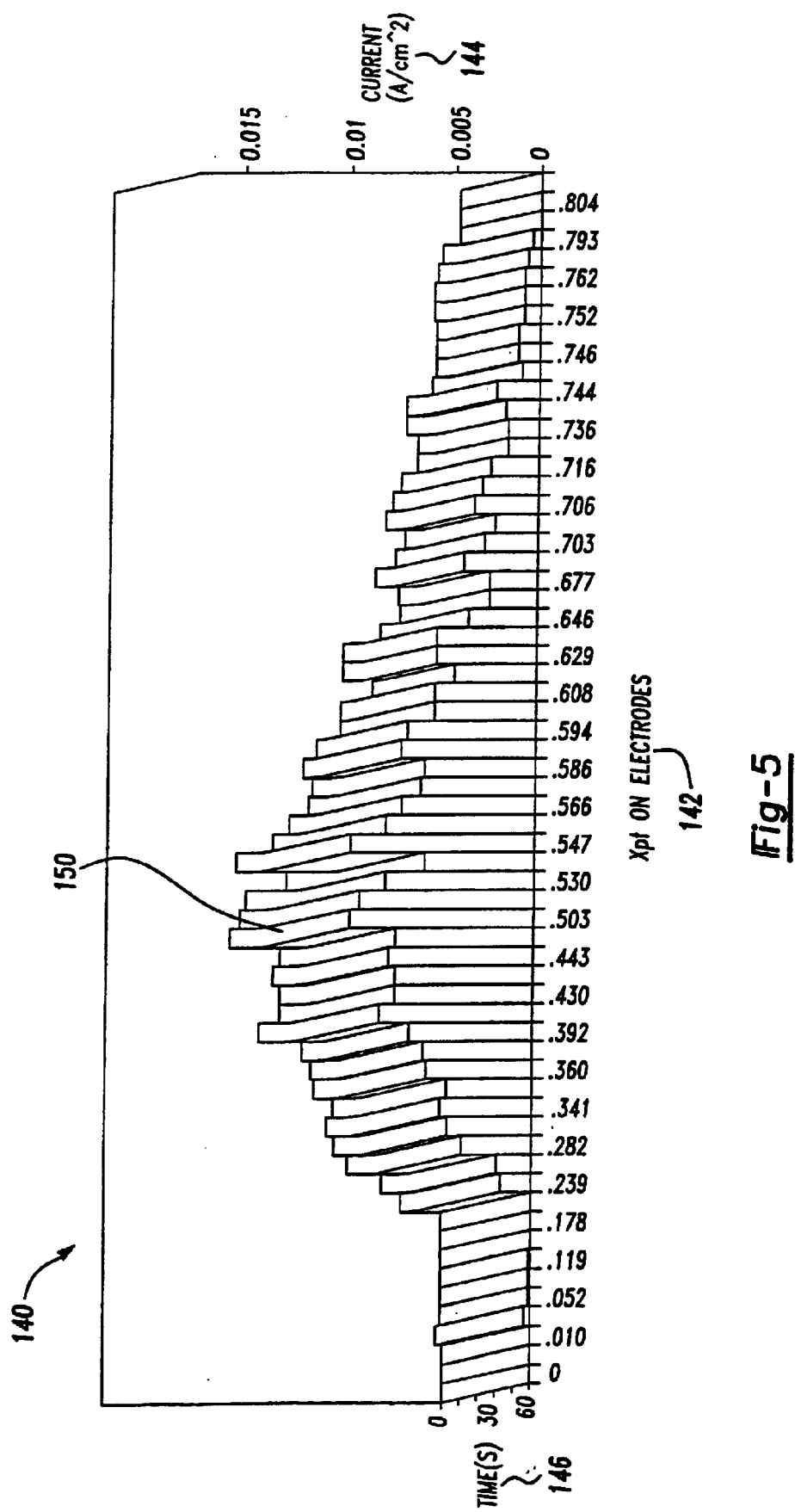
FIG. 5 is a graph illustrative of the relationship between electrode composition and associated activity for an example system synthesized and measured using embodiments of the present invention.

Referring now to FIG. 5, a three-dimensional plot 140 of electrode composition 142 (expressed as mole fraction platinum) versus current 144 (in amps per square centimeter) versus time 146 (in seconds) is displayed. Individual electrodes are represented by their compositions along the x-axis, with their associated activities represented by their current values on the z-axis. The most active electrode compositions 150 are centered around a 50:50

Pt:Ru electrode composition which agrees with results reported in the literature (e.g., D. Chu and S. Gilman, *J. Electrochem. Soc.* 1996, 143, 1685). Although the results plotted in FIG. 5 correspond to a simple binary library of Pt—Ru compositions made by the serial deposition of Pt—Ru solutions in a standard deposition chamber and studied by serial chronoamperometry measurements made on a single channel potentiostat, the same depositions and measurements could be made in parallel with a multipotentiostat using the deposition head and PCB interface of the present invention (FIGS. 3 and 4D). In fact, significantly more complicated libraries using ternary, quaternary and greater compositions are possibly simply by changing the composition of the initial plating solutions. Plating solutions comprising one or more of the water soluble forms of the transition elements (e.g., Sc, Ti, V, Cr, Mn, Fe, Co, Ni, Cu, Zn, Y, Zr, Nb, Mo, Ru, Rh, Pd, Ag, Cd, Hf, Ta, W. Re, Os, Ir, Pt, Au, Hg) as well as many main group elements (e.g., Al, Ga, Ge, In, Sn, Sb, Te, Tl, Pb, Bi) can be used with the present invention, and will give rise to enormous variations in library compositions which can in turn be studied in an enormous variety of catalytic systems.

As should now be readily apparent, the present invention provides a far superior method of electrochemically depositing and screening the properties of diverse materials. Using this invention, one can efficiently prepare libraries of varying elemental composition, and, since these libraries are prepared on individually addressable electrode arrays, one can also directly measure properties of these compositions. Using the present invention, it should be possible to synthesize and screen millions of new compositions at an unprecedented rate.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A system for electrochemically screening an array of materials, said system comprising:
   (a) an array of different materials having an individually addressable electrode corresponding to each different material in the array; and
   (b) means associated with each of said electrodes for simultaneously testing each of said materials for a common selected property, said means comprising an electrochemical cell, a multi-channel potentiostat, and a printed circuit board assembly, wherein said electrochemical cell comprises:
   a cylindrical glass housing, said housing sandwiched between end members and held in place with fasteners;
   a reference electrode compartment;
   a liquid filling hole;
   a cathode assembly; and
   an anode array assembly, said anode array assembly holding said array of individually addressable electrodes.

2. The system of claim 1, wherein said anode array assembly comprises:
   a first o-ring, said first o-ring forming a water-tight seal with said glass housing;
   a molded adapter having an inner flange, an outer flange, and at least one groove;
   an array of individually addressable electrodes;
   a second o-ring, said second o-ring fitting into said groove and forming a water-tight seal with said array of individually addressable electrodes;
   a printed circuit board;
   a ring of elastomeric contacts, said elastomeric contacts located between said array and said printed circuit board; and
   a backing plate.

3. The system of claim 2, wherein said printed circuit board comprises:
   a predetermined number of contact pads, said number of contact pads corresponding to the number of individually addressable electrodes on said array;
   at least four high density pin connectors;
   a common reference electrode contact; and
   a common counter electrode contact.

4. A system for electrochemically screening an array of materials, the system comprising
   an electrochemical cell comprising (i) an electrode array assembly comprising an array of two or more individually addressable electrodes, each of the two or more electrodes being adapted for supporting a member of the array of materials, the array of two or more individually addressable electrodes being on a substrate that further comprises two or more contact pads on the substrate, each of the two or more contact pads being electrically connected to a corresponding one of the two or more electrodes, the electrode array assembly further comprising a printed circuit board assembly comprising two or more contact pads arranged to correspond to the arrangement of contact pads on the substrate, the printed circuit board assembly providing electrical communication between the multi-channel potentiostat and each of the two or more electrodes of the array through the contact pads of the printed circuit board assembly and the corresponding contact pads on the substrate, (ii) a counter electrode, and (iii) a housing, configured in combination to define a cell for containing a liquid test solution such that each of the two or more electrodes or members supported thereon contact the test solution, and
   a multichannel potentiostat in electrical communication with the array of addressable electrodes for controlling the current or potential applied to each of the two or more electrodes of the array.

5. The system of claim 4 further comprising a reference electrode disposed within the housing and in electrical communication with the multi-channel potentiostat.

6. The system of claim 4 wherein the housing is sealingly engaged with the electrode array assembly.

7. The system of claim 4 wherein the substrate comprises the two or more contact pads disposed around a periphery of the substrate.

8. The system of claim 4 wherein the electrode array assembly further comprises an elastomeric contact pressed between the contacts pads of the printed circuit board assembly and the corresponding contact pads on the substrate, the elastomeric contact comprising wires providing electrical communication between the contact pads of the printed circuit board assembly and the corresponding contact pads on the substrate.

9. The system of claim 4 wherein the electrochemical cell further comprises an aperture for filling the electrochemical cell with a test solution or for draining a test solution from the electrochemical cell.

* * * * *